United States Patent Office 3,054,795
Patented Sept. 18, 1962

3,054,795
DIBENZANTHRONE VAT DYESTUFFS CONTAINING A REACTIVE TRIAZINE NUCLEUS
Max Staeuble and Kurt Weber, Basel, Switzerland, assignors to Ciba Limited, Basel, Switzerland
No Drawing. Filed June 16, 1960, Ser. No. 36,494
Claims priority, application Switzerland May 30, 1958
2 Claims. (Cl. 260—249)

This invention provides valuable new anthraquinone vat dyestuffs which correspond to the general formula (1)
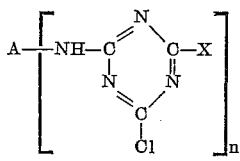

in which A represents a dibenzanthrone or isodibenzanthrone radical free from acid water-solubilizing groups, such as the sulfonic acid group, and X represents a non-vattable substituent containing at least three atoms, and $n$ represents the whole number 1 or 2.

The invention also provides a process for the manufacture of the dibenzanthrone or isodibenzanthrone vat dyestuffs of the above general formula, wherein an amino dibenzanthrone or an amino-isodibenzanthrone is condensed with a compound of the formula (2)
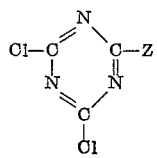

in which Z represents a chlorine atoms or a non-vattable substituent containing at least three atoms, and, when the condensation product so obtained contains a dichlorotriazine radical, one of the chlorine atoms is exchanged for a substituent containing at least three atoms.

As aminodibenzanthrone suitable for the process of this invention there may be mentioned more especially those of the formulae

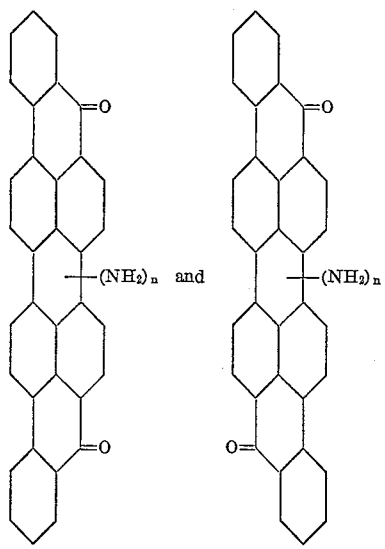

wherein $n$ is 1 or 2.

As compounds of the Formula 2 there are advantageously used those in which Z represents a chlorine atom or a non-vattable substituent containing at least three atoms, for example, an alkyl or alkoxy group, and advantageously one containing at most 6 carbon atoms, an aryloxy radical especially a benzene or phenoxy radical, a primary, secondary or tertiary amino group, for example, an —NH₂ group, a monoalkylamino or dialkylamino group, a monoethylamino or diethylamino group, a monobutylamino group, an ethylene-imino group, a mono- or di-β-hydroxyethylamino group, a monochlorethylamino or monocyanethylamino group, a mono- or di-carboxymethylamino group, an arylamino group, especially a phenylamino group, which may be substituted in the phenyl radical, advantageously by a hydrophilic group, for example, a carboxyl, sulfonamido, sulfone or alkoxy group, and also groups which can be converted into hydrophilic groups, for example, sulfofluoride, sulfochloride, carboxylic acid chloride, sulfonic acid ester or carboxylic acid ester groups. The radical Z may also represent an alkylmercapto or arylmercapto group, for example, a methyl-, carboxymethyl-, ethyl- or phenyl-mercapto group.

The reaction of the amino dibenzanthrones with the triazine of the Formula 2 is advantageously carried out in an inert organic solvent, for example, nitrobenzene, chlorobenzene or ortho-dichlorobenzene, at a raised temperature. The relative molecular proportions of the components are advantageously so chosen that one molecular proportion of a compound of the Formula 2 is present for each amino group of the benzanthrone compound.

When a triazine of the Formula 2 is used as starting material, in which Z represents a chlorine atom, that is to say cyanuric chloride, there is first obtained a dichlorotriazine in which one chlorine atom of the starting material has been replaced by a substituent containing at least three atoms, for example, by heating the cyanuric chloride with ammonia or an amine or an aliphatic or aromatic hydroxyl compound, advantageously in an inert solvent at a raised temperature. It is not necessary to isolate the primary condensation product, so that both reactions may be carried out in the same vessel. In the case of dyestuffs containing a hydroxyalkyl group, the hydroxyl group may be subsequently sulfated by reaction, for example, with concentrated sulfuric acid.

The dyestuffs so obtained may be isolated from the medium in which they are produced and worked up into useful dry dyestuff preparations, notwithstanding the presence of an exchangeable halogen atom. The dyestuffs are advantageously isolated by filtration. The filtered dyestuffs may be dried, if desired, after the addition of a neutral or weakly alkaline extender. The drying is advantageously carried out at not too high a temperature, if desired, under reduced pressure.

The new dyestuffs are suitable for dyeing a very wide variety of materials, and especially for dyeing or printing textile materials of natural or regenerated cellulose by the usual vat dyeing or printing processes. As the reactivity of the halogen atom in the triazine ring may vary somewhat from compound to compound, it is of advantage to choose the dyeing conditions to suit the dyestuff used, especially the concentration of the alkali or reducing agent, and also the duration and temperature during the dyeing or steaming. The most favourable conditions can easily be determined by preliminary experiments.

The dyeings and prints produced with the new dyestuffs are distinguished by their excellent fastness to light and properties of wet fastness.

In contradistinction to conventional vat dyestuffs, it is generally not possible to remove the dyestuffs of this invention from the fibre to any substantial extent by means of hot dimethyl-formamide, so that the dyestuffs are probably chemically bound to the fibre.

The dyeings produced with the dyestuffs of this invention are therefore also fast to dry cleaning and migration. The dyed fabrics can therefore be coated with artificial resins, for example, polyvinyl chloride, without the dyestuff migrating into the synthetic resin. This is especially important in the manufacture of artificial leather.

This application is a continuation in part of our patent application Serial No. 815,266, filed May 25, 1959.

The following examples illustrate the invention, the parts and percentages being by weight:

*Example 1*

23.6 parts of aminodibenzanthrone in 600 parts of nitro-benzene are stirred for 20 hours while being heated to 165-170° C. with 37 parts of cyanuric chloride and 1 part of pyridine. After cooling, the product is filtered off, washed in turn with nitro-benzene, benzene, and chloroform, and dried at 50° C. under reduced pressure.

12.4 parts of the condensation product of the formula

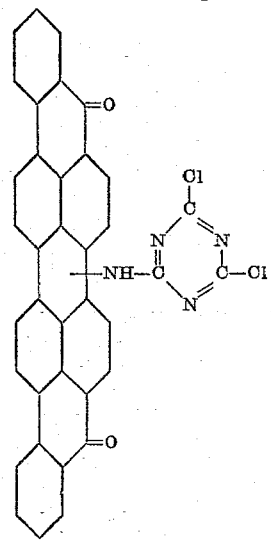

in 200 parts of nitrobenzene are stirred for 15 minutes at 90° C. After that, 4.2 parts of diethanol-amine in 50 parts of chloroform are slowly added dropwise in the course of 5 hours, and the mixture maintained at 90° C. for another 17 hours. After cooling, the reaction mass is filtered, washed in turn with benzene, alcohol, and water, and dried at 100° C. under reduced pressure.

10 parts of the condensation product of the formula

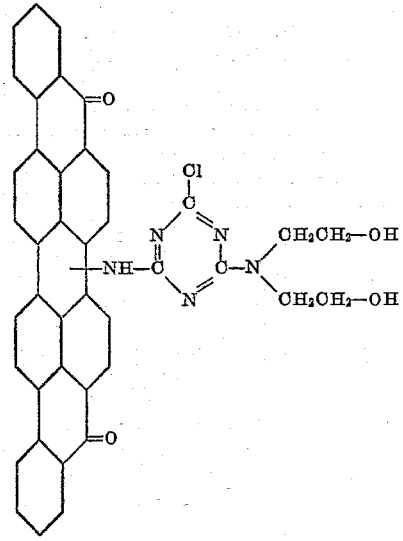

are dissolved in the course of 10 minutes in 100 parts of 100% sulfuric acid at 0-5° C. and the resulting solution at once carefully poured onto 1000 parts of ice. The precipitated product is filtered off, washed neutral with cold water and dried at 70-80° C. under reduced pressure.

The dyestuff of the formula

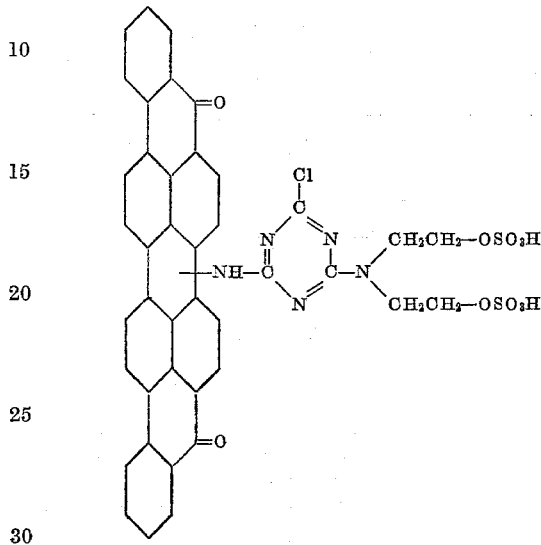

so obtained is insoluble in water, but is very easy to vat. When used for dyeing cotton or regenerated cellulose according to Example 22 at 80° C., powerful greenish gray shades of good fastness properties are obtained.

*Example 2*

42 parts of aminodibenzanthrone in 900 parts of dry nitrobenzene are stirred for 16 hours while being heated to 165-170° with 27 parts of cyanuric chloride and 1.2 parts of pyridine. When the cyanuration is complete the reaction mass is cooled to room temperature and the product isolated by filtration, washed with nitrobenzene, then with alcohol, and dried at 40° C. under reduced pressure.

31 parts of this cyanuration product are slurried in 1000 parts of nitrobenzene. There are added dropwise at 90-95° C. in the course of 3 hours 6 parts of monoethanolamine in 20 parts of chloroform. Stirring is continued for 6 hours, the dyestuff then filtered off, washed with alcohol, then with water, and dried under reduced pressure at 70° C.

The dyestuff of the formula

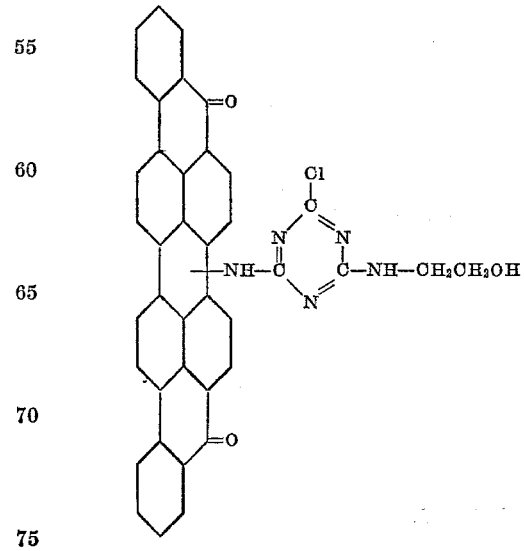

dyes cotton and regenerated cellulose from an alkaline hydrosulfite vat very fast blue-grey to black shades.

Similar dyestuffs which yield blue-grey to greenish-grey shades are obtained when in this example there is used instead of the monoethanolamine an equimolecular quantity of one of the starting materials shown in column II of the following table.

| I Example | II Starting material |
|---|---|
| 3 | CH$_3$—CH$_2$—CH(NH$_2$)—CH$_2$OH |
| 4 | CH$_3$—C(NH$_2$)(CH$_3$)—CH$_2$OH |
| 5 | HOCH$_2$—C(NH$_2$)(CH$_3$)—CH$_2$OH |
| 6 | HOCH$_2$—C(NH$_2$)(C$_2$H$_5$)—CH$_2$OH |
| 7 | HOCH$_2$—C(NH$_2$)(CH$_2$OH)—CH$_2$OH |
| 8 | H$_2$N—CH$_2$CH$_2$CH$_2$OH |
| 9 | H$_2$N—CH$_2$CH$_2$CH$_2$CH$_2$—OH |
| 10 | CH$_3$—NH—CH$_2$CH$_2$OH |
| 11 | H$_2$N—C$_6$H$_{11}$ |
| 12 | CH$_3$—NH—C$_6$H$_{11}$ |
| 13 | Cyclohexylamine |
| 14 | H$_2$N—C$_6$H$_4$—OH |
| 15 | H$_2$N—C$_6$H$_4$—OH (ortho) |
| 16 | H$_2$N—C$_6$H$_4$—Cl |
| 17 | H$_2$N—C$_6$H$_4$—NH$_2$ |
| 18 | H$_2$N—C$_6$H$_4$—CH$_3$ |
| 19 | H$_2$N—C$_6$H$_3$(OCH$_3$)—CH$_3$ |
| 20 | H$_2$N—C$_6$H$_3$(CH$_3$)—CH$_3$ |

*Example 21*

10 parts of the condensation product of the formula

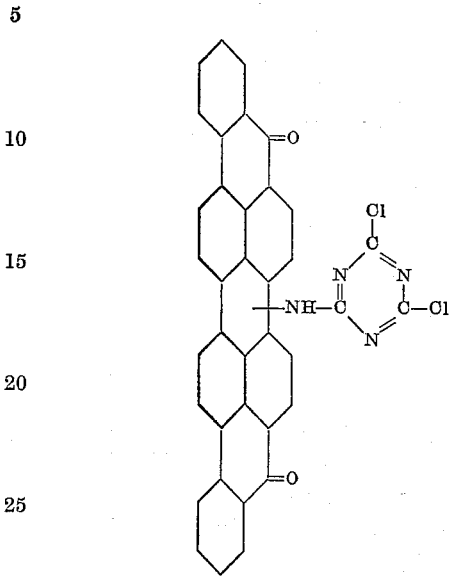

are stirred in 200 parts of nitrobenzene to form a fine suspension while the temperature is raised simultaneously to 95–100° C. A moderate stream of ammonia gas is then passed through the reaction mass for 1½ hours. The reaction mass is then allowed to cool, and the dyestuff isolated by filtration, washed in turn with benzene, alcohol, and water, and the new dyestuff of the formula

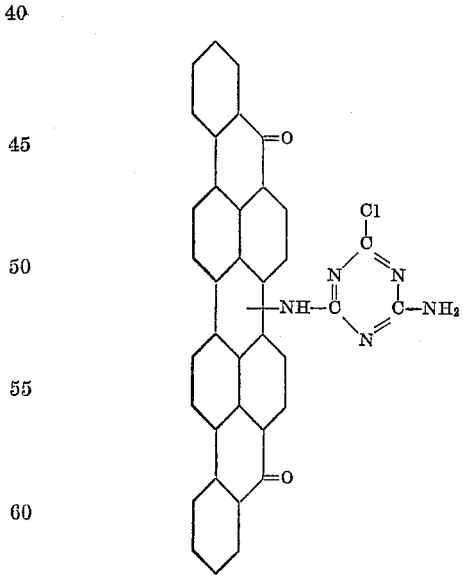

dried at 70°–80° C. under reduced pressure.

The product dyes cotton and regenerated cellulose from an alkaline hydrosulfite vat blue-black shades of very good fastness properties.

*Example 22*

1 part of the dyestuff obtained according to Example 1 is pasted with 250 parts of warm water. The resulting dyestuff suspension is introduced into a solution of 10 parts by volume of 30% sodium hydroxide solution and 6 parts of sodium hydrosulfite in 1750 parts of water, and vatted for 1 minute. In the resulting dyebath, 50 parts of cotton are dyed for 45 minutes at 80° C. with the addition of 60 parts of sodium chloride. The dyed material is then washed, oxidized, acidified, rinsed again, and soaped at the boil. There is obtained a greenish grey dyeing of very good fastness properties.

What is claimed is:
1. The dyestuff of the formula

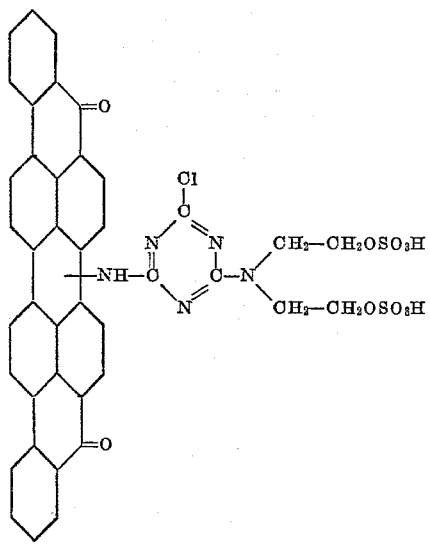

2. The dyestuff of the formula

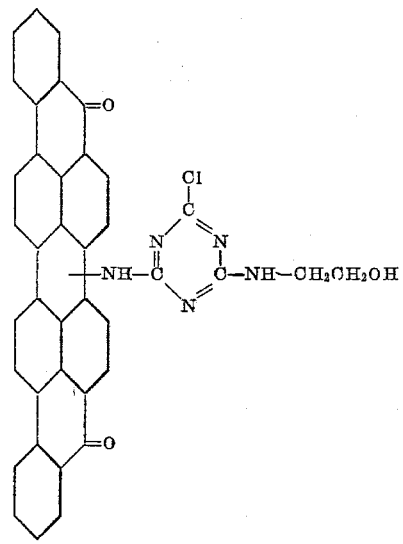

References Cited in the file of this patent
UNITED STATES PATENTS

| | | |
|---|---|---|
| 1,888,631 | Kunz et al. | Nov. 22, 1932 |
| 2,154,981 | Gubler et al. | Apr. 18, 1939 |
| 2,167,804 | Gubler et al. | Aug. 1, 1939 |
| 2,742,466 | Randall et al. | Apr. 17, 1956 |

FOREIGN PATENTS

| | | |
|---|---|---|
| 802,935 | Great Britain | Oct. 15, 1958 |
| 91,206 | Norway | Jan. 18, 1958 |
| 530,146 | Germany | July 22, 1931 |